Figures 1, 2, 3:
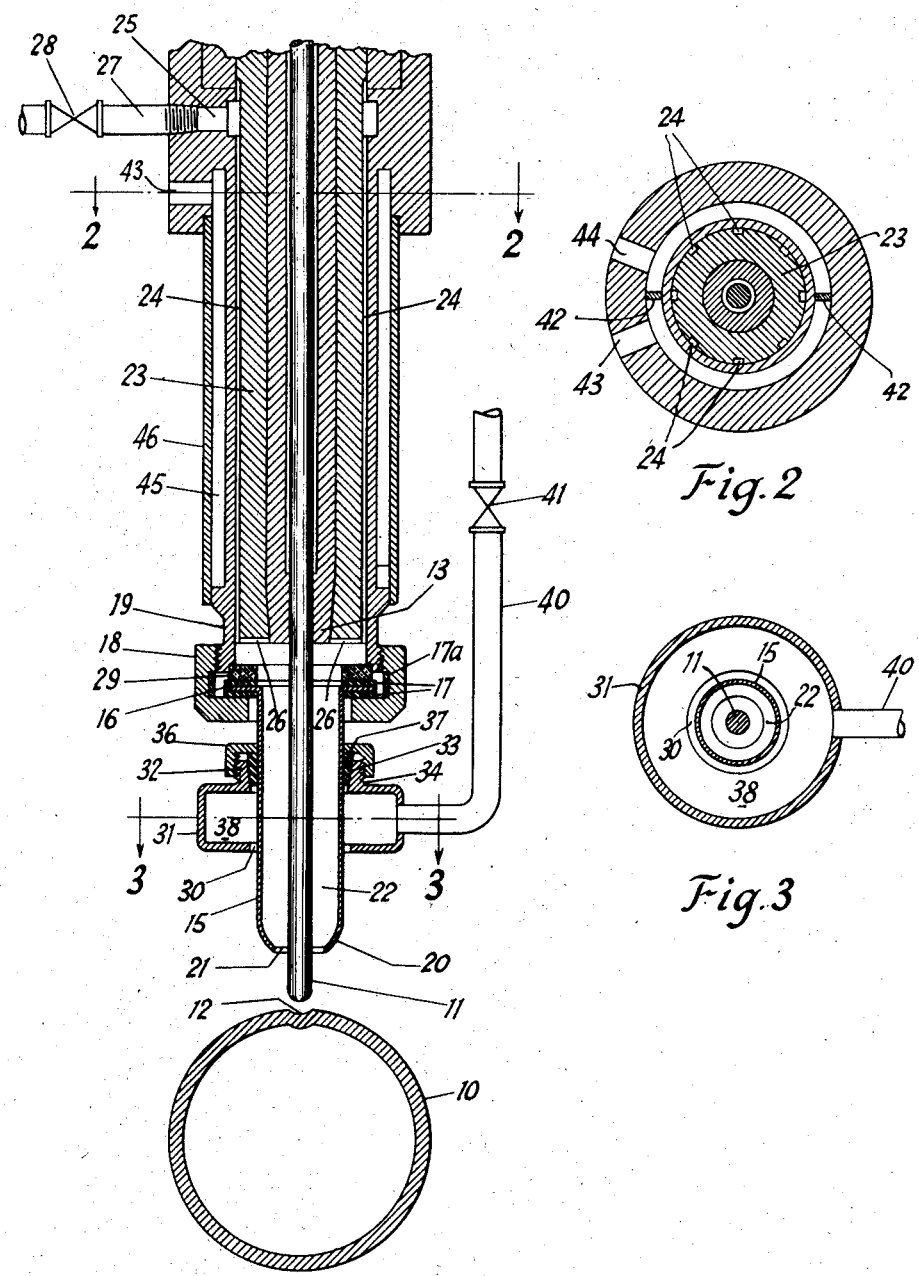

INVENTOR
Zigmont Edward Olzak
BY
ATTORNEY

UNITED STATES PATENT OFFICE 2,522,482

ELECTRIC ARC WELDING

Zigmont Edward Olzak, Beaver Falls, Pa., assignor to The Babcock & Wilcox Tube Company, West Mayfield, Pa., a corporation of Pennsylvania Application October 17, 1947, Serial No. 780,354

7 Claims. (Cl. 219—10)

My invention relates in general to improvements in inert gas-shielded arc welding, and more particularly, to an improved process of and apparatus for arc welding in which the arc is formed between a virtually non-consumable electrode and the work and a sheath of inert gas, such as argon or helium, is used to protect the weld metal puddles and electrode.

This method is particularly advantageous in welding stainless steels or metal parts which are of comparatively thin section. Gases such as argon and helium require only a relatively low voltage to start and maintain an arc, particularly as compared to the arc starting and maintaining voltage necessary with hydrogen when used under similar circumstances. While the use of argon or helium as a gaseous medium for arc welding has been extensive in the welding of metals, the fact that these gases are comparatively rare and expensive has been one of the commercial limitations on this type of welding. It has also been found that when the flow of helium, for example, is maintained at a low rate in order to keep down the cost, that there is evidence upon examination of the weld seam of an inadequate gaseous atmosphere protection of the seam metal when in the molten condition.

In the use of an argon or helium shielded arc in the production welding of a seam where the work piece moves relative to a super-positioned stationary electrode, it has also been found that the arc does not pass directly downward from the electrode to the work but tends to bend downstream, i. e. in the direction of work movement. Such an arc may also swing slightly to one side of the seam, so that the point of maximum heat may be other than centrally of the seam. This action is detrimental to securing a high quality weld.

Hydrogen, which is a reducing gas, when used as a shielding gas for an arc welding zone protects the weld metal from the development of oxides or nitrides. While hydrogen is available at satisfactory costs, its arc supporting characteristics are such that the voltage necessary to strike or maintain an arc does not meet requirement of a steady low voltage arc which can be regulated to give the desired rate of current input required for welding light-weight metal sections or special alloys.

The main object of my invention is the provision of a process of and apparatus for producing an inert gas-shielded welding arc which affords adequate protection of the molten seam metal and electrode, while being economical in the use of expensive gas and providing an arc of desirable characteristics. A further and more specific object is the provision of a process and apparatus of the character described in which the arc position is maintained centrally of the seam.

The various features of novelty which characterize my invention are pointed out with particularity in the claims annexed to and forming a part of this specification. For a better understanding of the invention, its operating advantages and specific objects attained by its use, reference should be had to the accompanying drawing and descriptive matter in which a preferred embodiment of the invention is illustrated and described.

Of the drawing:

Fig. 1 is a sectional elevation of a portion of a welding head constructed in accordance with my invention; and Figs. 2 and 3 are horizontal sections on the lines 2—2 and 3—3 respectively of Fig. 1.

My invention is illustrated in connection with and particularly applicable to the arc welding of the longitudinal seam in a tube blank 10 formed of stainless steel, where the tube blank is moved at a controlled speed relative to a stationary welding head having a tungsten electrode 11 from which an arc passes to the work and a longitudinal seam of weld metal results. The tungsten electrode 11 is mounted in an electrode holder 13 and brought into proper arcing relationship above the seam cleft 12 of the tube blank by the movement of the associated welding head. The tube blank is continuously advanced by pressure rolls (not shown) and the heat of the arc progressively melts the metal of the adjacent edges of the cleft and the metal upon solidifying after leaving the arcing zone forms a continuous weld. Hydrogen is normally supplied to the interior of the tube in the welding zone through a mandrel (not shown).

A substantially cylindrical nozzle member 15 is positioned about the lower end of the electrode and is secured to the remaining part of the welding head by having an annular external flange 16 on its upper end positioned between electrically insulating gaskets 17 and held in its assembled position by an inverted clamping nut 18 engaging the threaded lower end of a sleeve 19 and including a short electrically insulating collar 17ª on its inner periphery to take care of any shifting of the nozzle flange. The nozzle member extends downwardly to a position slightly above the operative level of the arcing end of the electrode where it terminates in a converging tip 20 having a central circular discharge port 21. A gas discharge annulus 22 thus extends about the electrode to direct a flow of gas longitudinally of the electrode to blanket the work seam in an arc surrounding relationship. The sleeve 19 surrounds an inner barrel member 23 in which the electrode holder is positioned, with the external surface of the barrel 23 grooved as shown in Fig. 2 to form circumferentially spaced gas passages 24 between the barrel and sleeve 19. The barrel 23 is adjustable vertically to control arc length and thereby arc voltage. The upper ends of the passages 24 open into an annular recess or inlet chamber 25 formed in the upper part of the sleeve 19 of the welding head and having a gas connection 27 at one side thereof. The lower ends of the gas passages 24 open into corresponding radial slots 26 in the lower end of the sleeve 19. A brass washer 29 separates the slotted end of the sleeve from the upper gasket 17. The flow of gas into the inlet chamber 25 is regulated by a suitable valve 28 controlled by a suitable metering device (not shown).

In accordance with my invention, a second gas is directed towards the work in an annular stream concentric with the central or inner gas stream from the nozzle 15, by an annular discharge port 30 of a manifold 31 extending around the nozzle 15 at a position spaced upwardly from its converging tip 20. The manifold is adjustably mounted for vertical movement on the nozzle 15 through an upstanding flange 32 on its top side having an upwardly flaring inner side 33 and a threaded outer side 34. An annular retaining nut 36 engages the threaded flange and forces a suitable packing 37 into the V-notch formed between the manifold flange 32 and nozzle 15 to provide both a gas seal therebetween and a mechanical fastener for adjustably holding the manifold in position on the nozzle. The manifold 31 thus forms an annular chamber 38 with an annular discharge port 30 therein directly about the cylindrical wall of the nozzle 15. A conduit 40 supplies a regulated gas flow to the chamber 38, the regulation being accomplished by a suitable valve 41 controlled by a metering device (not shown). The manifold 31 thus embraces the nozzle 15 with a mounting thereon so that it may be moved axially thereof to vary the position of discharge port 30 relative to the discharge end of nozzle 15 and the electrode end. The gas streams form an arc enveloping and a work blanketing atmosphere and are desirably delivered at relatively low pressures.

The lower part of the welding head is liquid cooled by an annular jacket 45 formed between the sleeve 19 and a casing sleeve 46, as shown in Fig. 1, and a water flow therethrough is provided by partly dividing the water jacket space by longitudinal partitions 42 circumferentially positioned between a water inlet 43 and outlet 44, as shown in Fig. 2.

With the welding head in operative relationship to a seam cleft and with the proper energization of the electrode, a flow of argon or helium from a pressure source is directed through conduit 27 at a controlled rate, so that it flows through the chamber 25, passages 24, slots 26, and nozzle annulus 22 and embraces the arc from the electrode to the work in a gaseous envelope and blankets the seam metal, thereby preventing the surrounding air from contacting with the molten metal resulting from the arc action. At the same time a regulated stream of a second gaseous fluid, preferably hydrogen, having a substantially higher arc supporting potential is directed through conduit 40 to manifold chamber 38 from a pressure source and the gas stream is discharged through the discharge port 30 to form an annular envelope about the lower converging nozzle 15 down to the work piece.

The annular stream of hydrogen provides a second gaseous envelope which acts to prevent the air from reaching the metal of the weld zone while it is still at a temperature such that the oxygen or nitrogen of the air might react therewith in a deleterious manner.

The flow of helium and hydrogen is closely regulated and proportioned, a flow of 12–31 cu. ft. of helium per hour and a flow of 15–50 cu. ft. of hydrogen per hour being found to be particularly effective in the welding of stainless steel tubes, for example. A $\frac{1}{16}''$ diameter electrode was used with a straight polarity direct current of 150–400 amperes and an arc voltage of 11–15. The inner gas discharge port 21 was $\frac{3}{8}''$ diameter, the nozzle 15 was $\frac{3}{4}''$ diameter, and the outer gas port 30 was .025–.075'' wide. The electrode was positioned from the work a distance of $\frac{1}{32}-\frac{1}{16}''$. The cheaper hydrogen gas thus constituted 30–60% of the total gas consumption and the total cost in attaining adequate protection is substantially lower than if helium alone were used.

In using an annular stream of hydrogen about the central arc-enveloping stream of helium, it is necessary to so control the flow of the hydrogen from the manifold annular discharge port 30 that the annular stream will be maintained with a minimum of admixing of the hydrogen into the central helium stream where they come together at the lower end of the nozzle 15, since admixture of hydrogen into the helium stream decreases the stability of the helium embraced arc. As helium is heavier than hydrogen, the central mass of helium will have a tendency to keep the encircling stream of hydrogen away from the welding zone, avoiding entrainment of hydrogen in that portion of the helium stream immediately surrounding the arc and molten metal in the welding zone.

With controlled streams of helium and hydrogen directed in the manner described, it has been found that an improved arc form occurs, in that the arc passes directly downward to the work and the downstream bending of the arc which has been observed with the use of helium alone, is avoided. The annular hydrogen stream about a central helium arc-enveloping stream thus permits relatively low voltage and stabilized arc characteristics, while at the same time it insures a form of arc which is directed axially from the electrode and will closely follow the line of the seam cleft, resulting in a more uniform welding heat input to the opposite edges of the work seam cleft.

Although the invention has been specifically described with respect to the use of helium as the inert gaseous medium to sheath the arc, argon may also be so used, the proper adjustments being made in view of its substantially greater density. When argon is used for the inner sheath, it is also possible, but less effective, to use helium in place of hydrogen for the outer sheath.

When the inner and outer shielding gas streams are either argon or helium and hydrogen or argon and helium respectively, the electrode is surrounded by an inner layer of inert gas of relatively low arc supporting potential and an outer layer of a gas of relatively higher arc supporting potential, whereby the electrode and molten work metal are shielded with an inert non-reactive atmosphere and the arc is maintained in a centralized position relative to the line of the seam cleft.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of the invention may sometimes be used to advantage without a corresponding use of other features.

I claim:

1. A method of inert-gas shielded electric welding comprising maintaining an arc between an electrode and a metal workpiece to form a weld zone, directing a stream of inert gas having a relatively high density and a relatively low arc supporting potential about the arc to shield the latter and molten metal in the weld zone, and directing a stream of gas having a relatively lower density and a relatively higher arc supporting potential closely around the first-mentioned gas stream.

2. A method of inert-gas shielded electric arc welding comprising maintaining an arc between an electrode and a metal workpiece to form a weld zone, directing an annular stream of inert gas having a relatively high density and a relatively low arc supporting potential about the arc to shield the latter and molten metal in the weld zone, said inert gas being selected from the group comprising helium and argon, and separately directing an annular stream of non-oxiding gas having a relatively lower density and a relatively higher arc supporting potential closely around the first-mentioned gas stream to centralize the position of the arc, said non-oxidizing gas being selected from the group comprising hydrogen and helium.

3. An electric arc welding process comprising maintaining a stream of inert gaseous medium having a relatively high density and a predetermined low arc supporting potential, striking and maintaining an arc between an electrode and a metal workpiece to form a weld zone, the arc being enveloped in said medium, and embracing said stream of gaseous medium with a stream of non-oxidizing gas having a relatively lower density and an arc supporting potential relatively higher than that of said medium.

4. A method of weld uniting metal by an electric arc comprising striking an arc between a metallic electrode and a metal workpiece to form a weld zone, maintaining the arc in a stream of helium, and directing an enveloping stream of hydrogen about the helium stream, whereby the hydrogen exerts a direction stabilizing influence on the arc.

5. An electric arc welding process comprising striking an arc between an electrode and a metal workpiece to form a weld zone, directing an annular stream of helium about the arc to blanket molten metal in the weld zone, and directing a confining annular stream of hydrogen about the helium stream, whereby the hydrogen exerts an influence on the arc form.

6. A method of welding a longitudinal seam in a metal workpiece comprising striking an arc between an electrode and the workpiece, maintaining the arc in a central stream of an inert gas, said inert gas being selected from the group comprising helium and argon, and directing a parallel enveloping stream of hydrogen about said inert gas stream, whereby the position of the arc relative to the seam cleft is stabilized.

7. An electric arc welding process comprising striking an arc between an electrode and a metal workpiece to form a weld zone, maintaining the arc in a stream of gas selected from the group comprising helium and argon, and directing, about such stream, an enveloping stream of gas from the group comprising hydrogen and helium, whereby the hydrogen exerts an influence on the arc form.

ZIGMONT EDWARD OLZAK.

REFERENCES CITED

The following references are of record in the file of this patent:

UNITED STATES PATENTS

| Number | Name | Date |
|---|---|---|
| 903,826 | Arsem | Nov. 17, 1908 |
| 1,707,433 | Hand | Apr. 2, 1929 |
| 1,746,207 | Alexander | Feb. 4, 1930 |
| 1,866,044 | Krebs | July 5, 1932 |
| 2,053,417 | Brace | Sept. 8, 1936 |
| 2,274,631 | Meredith | Feb. 24, 1942 |
| 2,314,628 | Pavlecka | Mar. 23, 1943 |
| 2,342,086 | Meredith | Feb. 15, 1944 |
| 2,376,265 | Meredith | May 15, 1945 |
| 2,468,808 | Drake | May 3, 1949 |